Patented July 2, 1929.

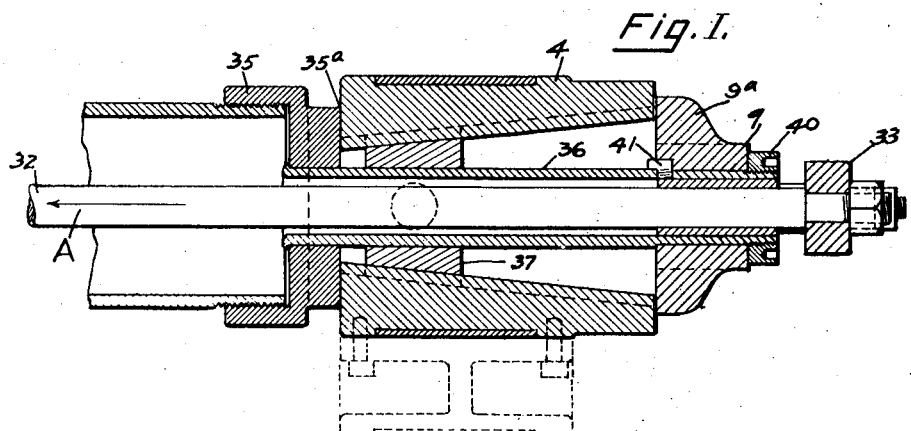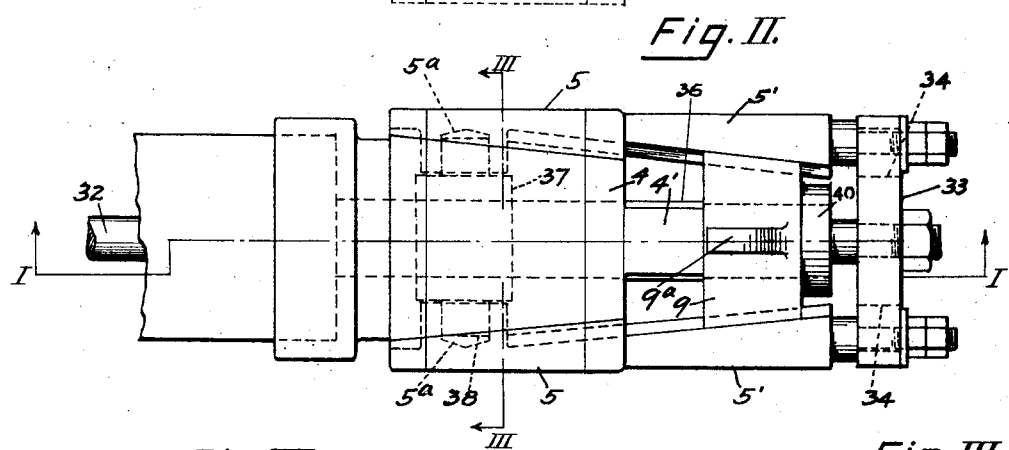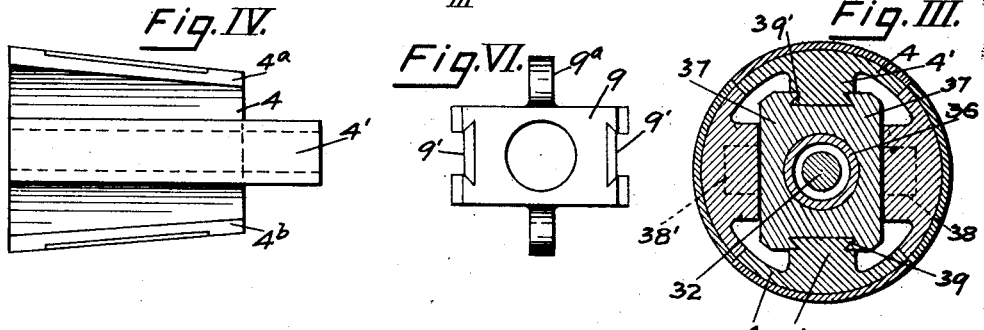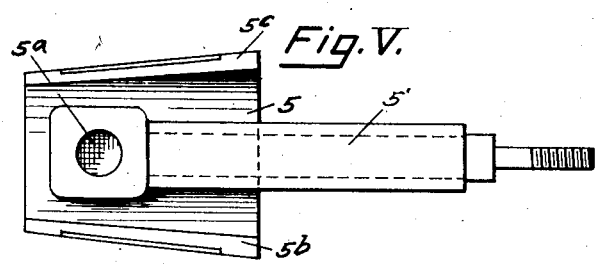

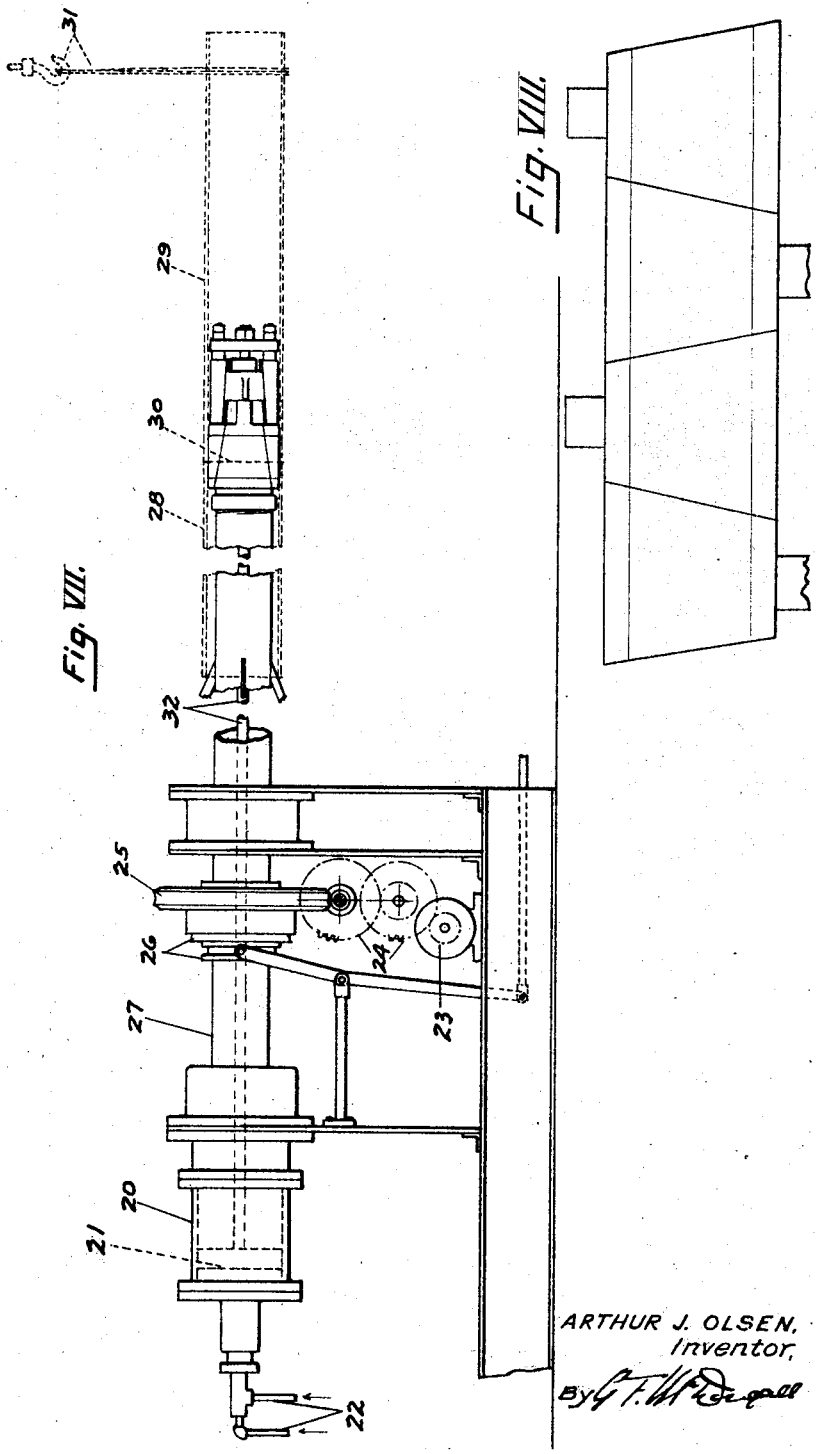

1,719,720

UNITED STATES PATENT OFFICE.

ARTHUR J. OLSEN, OF PORTLAND, OREGON, ASSIGNOR TO BEALL PIPE AND TANK CORPORATION, OF PORTLAND, OREGON, A CORPORATION OF OREGON.

EXPANDING MANDREL.

Application filed June 23, 1928. Serial No. 287,855.

The purpose of my invention is to provide an expanding mandrel composed of a plurality of expanding segments that will expand in such a manner as to produce a smooth outside surface that is substantially a true cylinder when the mandrel is in an expanded position.

One of the principal uses of my expanding mandrel is to hold two pieces of pipe in juxtaposition for welding a girth seam and joining them together by autogenous welding processes, but it is well adapted to other uses.

I am aware that heretofore expanding mandrels of various descriptions and containing segmental parts have been used for many years. But I am not aware that any mandrel using the construction shown and described in this specification has ever been constructed or used before my invention thereof.

In the use which I have above mentioned, an expanding mandrel is placed inside of the two pieces of pipe at the joint to be welded and a very considerable force applied to bring them into truly cylindrical shape and uniform relative position to each other for welding; and an expanding mandrel which has segments that leaves gaps between the segments when in an expanded position will leave the surface of the pipe in a series of curves and tangents instead of a truly cylindrical outline, which defect my new invention completely overcomes.

I accomplish the objects specified by the mechanism shown in the accompanying drawings, in which Fig. I is a longitudinal section of my new mandrel, on the line I—I, Fig. II; Fig. II is an orthographic projection substantially at right angles to the section shown at Fig. I; Fig. III is a cross-section taken on the line III—III of Fig. II; Fig. IV is an inside view of the oblique cylindrical section designated by numeral 4; Fig. V is an inside view of the oblique cylindrical section designated by numeral 5; Fig. VI is an end view of the stop block shown in the drawings by numeral 9; Fig. VII is an assembly of my new expanding mandrel and a mounting in a diagrammatic form intended to show means for operating the mandrel and giving it a revolving motion so that the seam to be welded can be presented to a welding means at a desirable rate of speed. Fig. VIII is what is known in draftsman's parlance as a "stretchout" and merely represents what a piece of thin paper would look like if measured carefully around the perimeter or working surface of each section and then flattened out and laid side by side. It is inserted as an explanation of what is meant by oblique-cut cylindrical sections, and having no parts except boundaries does not require reference letters.

In the drawings, a cylinder 20 contains a double-acting piston 21, diagrammatic means for controlling the same being shown at 22, which will be assumed to give it motion in selected directions; a motor 23 driving the gear train 24, co-operating with a worm-wheel 25, controlled by a clutch mechanism 26, will impart a revolving motion to the hollow shaft 27, upon which is mounted my new expanding mandrel completely described hereinafter in detail.

Two pieces of pipe to be welded end to end are represented in dotted outline by the numerals 28 and 29 and the girth seam to be welded is represented by the dotted line 30. Means for axial adjustment for the two pieces of pipe to be welded is represented by the hook and chain 31.

The piston 21 operates a piston rod 32, to which is attached a crosshead 33 having slot-shaped holes 34, and the stem portion 5' is secured through the slot 34 loosely so that it can move within radial limits fixed by the slot.

To attach my expanding mandrel to the hollow shaft 27, a reducer 35 carries a tube 36, upon the outside of which is slidably mounted a trunnion block 37, upon two sides of which are formed trunnions 38 and 38', and in the other two sides of which are cut tapered, dovetailed grooves 39 and 39'. Upon the end of the tube 36 is fixed the stop block 9, which is secured in fixed position by the threaded nut 40 and the key 41.

The oblique cylindrical sections 4 and 5 are plural in the construction shown, there being two of each as designated at Fig. IV and Fig. V, upon the outside or working surface of which is attached a plate of copper for the well-known purpose of preventing the weld from adhering to the mandrel. Casual inspection of Fig. IV and Fig. V seems to indicate that they are tapered axially, which is not the case and an explanation of this is found in the development of the surface shown in Fig. VIII, which drawing is inserted for clarity.

The stem portion of the oblique cylindrical section 5, and designated by 5', may be either made in one piece with the rest of the section or attached to it by convenient substantial means, and has at the section end thereof a pocket 5ª, adapted to contain the trunnion 38, and the stem portion 5' is machined to a running fit in the dovetailed groove 9' of the stop block 9. A motion shown in the direction of the arrow A, imparted to the piston rod 32, will be transmitted through the crosshead 33, and imparted to the oblique cylindrical section 5 by its stem portion 5', and by means of the pocket 5ª, similar longitudinal motion will be imparted to the slidably mounted trunnion block 37, within the tapered, dovetailed grooves whereof are the stems 4' of the oblique cylindrical section 4.

The tapered, dovetailed grooves in the trunnion block 37 are cut to the same taper as the dovetailed grooves shown in the stop block 9, to tend to produce the same radial movement in the cylindrical sections 4 and 5, but the principal guiding movement is afforded by the edges of the oblique cylindrical sections designated in the drawings as 4ª, 4ᵇ, 5ᶜ, and 5ᵇ.

The oblique cylindrical sections 4, of which there are two shown in this construction, are secured against longitudinal movement by the lugs 9ª on the stop block 9, and the shoulder 35ª on the reducer, 35.

It will thus be observed that my new mandrel will expand to a truly cylindrical fixed diameter, which diameter may be changed at will by adding sections on the outside as shown in dotted outline in Fig. I, and that while the non-expanded outline of the mandrel will not be truly cylindrical, it is not required to be and a much greater degree of radial motion is possible with my new construction than can be found in other expanding mandrels capable of exerting equal expansive power.

My new mandrel provides much more substantial construction than commonly found in devices of this character, and a complete absence of pins, toggle joints, and similar fast-wearing parts will be noted.

Having thus fully described my invention and its uses, so that it might be made and used by anyone skilled in the art to which it appertains, what I claim as new and desire to secure by Letters Patent is:

1. In an expanding mandrel, a plurality of oblique cylindrical sections, edge-guided and with adjacent sections in opposed direction, and means for forcibly moving said oblique cylindrical sections axially to increase the diameter of the assembly, with means for reverse motion to decrease the diameter of the assembly.

2. In a sectional expanding mandrel, four oblique-cut cylindrical sections assembled with adjacent sections opposed and all edges in juxtaposition, said oblique-cut cylindrical sections to be edge-guided and adapted to expand diametrically without leaving an opening between the edges of any sections, and means for forcibly producing axial movement of a plurality of these sections for the purpose specified.

3. In a sectional expansible mandrel, a plurality of oblique-cut, edge-guided cylindrical sections, a hollow mounting therefor, a piston rod through said hollow mounting, means for producing selective motion for said piston rod, and tapered guide members for said cylindrical sections adapted to produce radial motion of said cylindrical sections when the said piston rod is moved in one direction and a reverse radial motion when it is moved in the opposite direction.

4. In a sectional expansible mandrel, a plurality of oblique-cut, edge-guided cylindrical sections, a hollow mounting therefor, a piston rod through said hollow mounting, means for producing selective motion for said piston rod, and tapered guide members for said cylindrical sections adapted to produce radial motion of said cylindrical sections when the said piston rod is moved in one direction and a reverse radial motion when it is moved in the opposite direction, with auxiliary guide means for retaining the sections in assembly.

5. In a sectional expansible mandrel, a plurality of oblique-cut cylindrical sections, alternate sections being in reverse position to adjacent sections, with edges in juxtaposition, guide means for holding said sections on a mandrel and permitting radial movement to one-half the number and both axial and radial movement to the other half of the number, and means for producing such movement whereby the mandrel as a whole may become contracted and expanded at will.

6. In a sectional expansible mandrel, a plurality of oblique-cut cylindrical sections, alternate sections being in reverse position to adjacent sections, with edges in juxtaposition, guide means for holding said sections on a mandrel and permitting radial movement to one-half the number and both axial and radial movement to the other half of the number, and power means for producing such movement whereby the mandrel as a whole may become contracted and expanded at will.

7. In a sectional expansible mandrel, a plurality of oblique-cut cylindrical sections, alternate sections being in reverse position to adjacent sections, with edges in juxtaposition, guide means for holding said sections on a mandrel and permitting radial movement to one-half the number and both axial and radial movement to the other half of the number, and piston operated means for producing such movement whereby the mandrel as a whole may become contracted and expanded at will.

ARTHUR J. OLSEN.